Sept. 2, 1958 J. V. BLANKENBAKER 2,850,233

ELECTRONIC FIVE'S MULTIPLE GENERATOR

Filed Sept. 15, 1953

INVENTOR.

JOHN V. BLANKENBAKER,

BY

Lester S. Hecht

HIS ATTORNEY.

2,850,233

ELECTRONIC FIVE'S MULTIPLE GENERATOR

John Virgil Blankenbaker, Albany, Oreg., assignor, by mesne assignments, to Hughes Aircraft Company, a corporation of Delaware Application September 15, 1953, Serial No. 380,272

7 Claims. (Cl. 235—61)

This invention relates to electronic five's multiple generators and, more particularly, to a multiple generator for producing output signals corresponding to the product of fives times a binary-coded decimal input number represented by corresponding input signals.

The present invention provides a five's multiple generator which is particularly useful in a serial binary-coded decimal multiplier system of the type described in copending U. S. patent application Serial No. 381,181, for "Serial Binary-Coded Decimal Multipliers," by John V. Blankenbaker, filed September 21, 1953. In the particular utilization of the five's multiple generator described in this application, multiplication is performed by combining the partial products of 1, 2, 4, and 5 times the multiplicand in a three-input adder circuit. As is fully explained in the copending application, the introduction of the five's multiple generator considerably simplifies the problem of combining the partial products since all complete product digit combinations may be obtained by adding one or two of the partial products.

The five's multiple generator of the present invention may also be utilized as a divide-by-two circuit wherein the five's multiples are effectively divided by ten with the introduction of a four binary digit shift. The divide-by-two circuit is useful, by way of illustration, in a multiply-and-divide-by-two type of multiply unit such as is described on page 205 and pages 221 through 225 of "Synthesis of Electronic Computing and Control Circuits" by the Staff of the Computation Laboratory, published in 1951 by the Harvard University Press, Cambridge, Massachusetts.

Several forms of electronic multiply-by-five or divide-by-two systems have been utilized in the computing art; illustrative prior art embodiments being described on pages 202 and 225 of the above-mentioned publication by the Harvard press. In general these circuits utilize vacuum tube or rectifier operators in a matrix conversion of the input signals to form the desired set of output signals. As will be better understood after the present invention is considered in detail, a conversion of input signals through a matrix requires a considerable number of gating elements and results in a large power dissipation, relative to that required with the present invention.

The present invention provides a serially operable five's multiple generator wherein an economic utilization of gating circuit elements is achieved by forming each binary digit of the five's multiple or product as a function of the previously formed binary digit, thus obviating the redefinition, through separate gating circuit elements, of functions previously represented by signals.

For purposes of illustrating the present invention, it is assumed at the outset that the five's multiple generator of the present invention operates on serially received binary-coded decimal input numbers to produce the corresponding binary-coded decimal five's multiple or product output number, where each decimal digit of the input and output number is represented by four binary digits in the 8-4-2-1 code.

The circuit economy achieved by the present invention is also due to an efficient utilization of binary digit storage devices, commonly referred to as flip-flops. In the five's multiple generators of the present invention the signal input functions are selected so that a minimum of flip-flops are required for digit storage. In addition, by forming each binary digit as a function of the previously formed digit it is possible to derive many of the binary digit signals necessary for forming the five's product from a series of shifting register stages which may also be utilized in other parts of the multiplication or division system. As a result of this efficient utilization of flip-flops, a five's multiple generator according to the present invention may be introduced into a serial multiplication system with the additional requirement of only one or two flip-flops and 38 rectifier gating elements connected as two-level operators. Reference to the above-mentioned Harvard publication indicates that this provides a considerable improvement over a similar prior art circuit.

Accordingly it is an object of the present invention to provide a five's multiple generator wherein an economic utilization of gating circuit elements is achieved by forming each binary digit of the five's multiple as a function of the previously formed binary digit.

Another object of the invention is to provide an electronic five's multiple generator wherein a minimum of flip-flops are required for digit storage; the efficient utilization of flip-flops resulting from a novel definition of signal input functions.

A further object is to provide a serial five's multiple generator wherein the binary digit signals required for forming the five's multiple are derived from a series of shifting stages, the generator requiring only one or two additional flip-flops.

Yet another object is to provide a five's multiple generator which may be introduced into a serial multiplication system with a minimum requirement of additional flip-flops and gating circuit elements.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
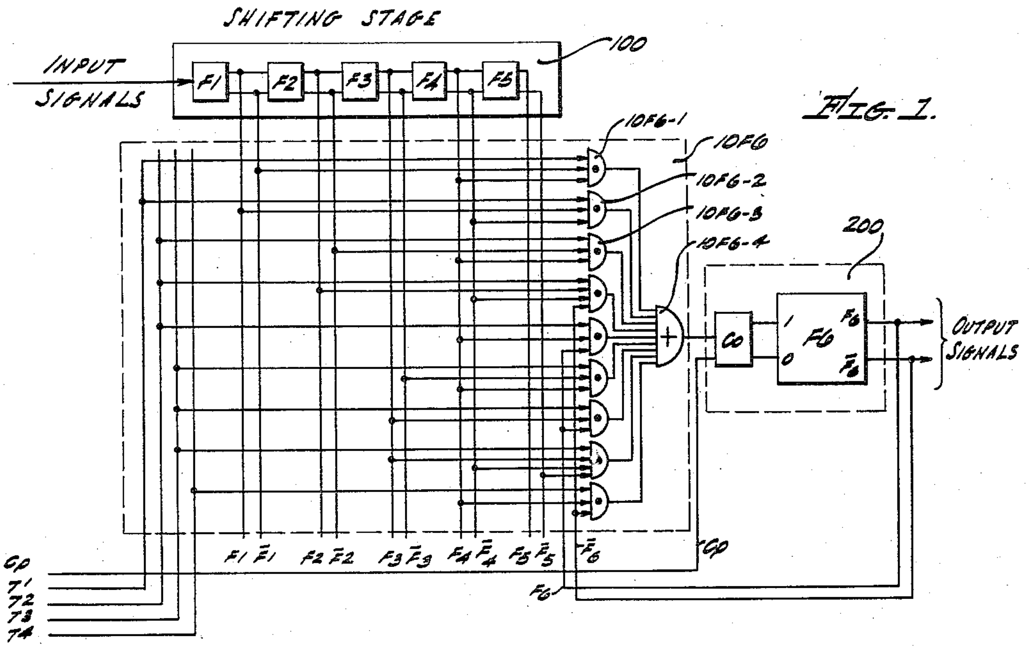
Fig. 1 is a schematic diagram of a five's multiple generator, according to the present invention, requiring only one flip-flop in addition to a five flip-flop shifting stage.

Reference is now made to Fig. 1 wherein there is shown one form of five's multiple generator, according to the present invention, comprising a five flip-flop shifting stage 100 including flip-flops F1, F2, F3, F4, and F5; and a five's multiple digit storage stage 200 including a flip-flop F6, gating circuit 10F6 and complementer circuit Co. The flip-flops in shifting stage 100 need not be considered as part of the five's multiple circuitry since this stage may be part of the multiplicand circulation path during multiplication, or utilized otherwise during division.

Gating circuit 10F6 is mechanized according to logical Boolean equations which indicate the sequence of stable states which flip-flop F6 is to assume during operation. Before the present invention may be fully understood it is necessary to consider the derivation of these logical equations, and therefore the preliminary discussion which follows relates to the general algebraic theory underlying all embodiments of the present invention.

In general the algebraic notation which is utilized in this application is consistent with that employed in copending U. S. patent application Serial No. 373,586, for "Electronic Multiple Product Generators" by R. R. Johnson, filed August 11, 1953, now abandoned. The input or times 1 product digits are represented as $W_k^j$, and the five's multiple digits as $Z_k^j$, $j$ and $k$ respectively indicating the binary and decimal digit positions. Thus the four binary digits of a decimal input digit $k$ are represented by the notations $W_k^4$, $W_k^3$, $W_k^2$, and $W_k^1$ representing relative weights of 8, 4, 2, and 1, respectively. Similarly the four binary digits of the corresponding five's multiple or product number are represented by the notations $Z_k^4$, $Z_k^3$, $Z_k^2$, and $Z_k^1$, also representing relative weights of 8, 4, 2, and 1, respectively. The unit carry, the two-unit carry, and the four-unit carry are designated $C_k^1$, $C_k^2$, and $C_k^3$, respectively. It will be noted that the letter Z is appropriately also utilized to represent the eight's multiple digits in the above-mentioned copending application by R. R. Johnson since the eight's and five's multiple generators are utilized interchangeably in different multiplication systems.

In multiplying the decimal digit set $W_{k-1}^4$, $W_{k-1}^3$, $W_{k-1}^2$, and $W_{k-1}^1$ by five in the 8-4-2-1 code, the carries or left-hand digits $C_k^3$, $C_k^2$, and $C_k^1$ are formed, having the weights 4, 2, and 1 respectively, and are equal respectively to the digits $W_{k-1}^4$, $W_{k-1}^3$, and $W_{k-1}^2$. Thus the multiplication-by-five of the binary digit groups 0000 (0), 0001 (1); 0010 (2), 0011 (3); 0100 (4), 0101 (5); 0110 (6), 0111 (7); and 1000 (8), 1001 (9), provide the carry signal groups 000; 001; 010; 011; and 100, respectively, where the decimal equivalent in the 8-4-2-1 code of each binary digit group is indicated by a decimal digit in parenthesis appearing immediately to the right of the group. The complete times five digit $Z_k^j$ is then obtained by adding, as binary numbers, the carries $C_k^j$ to zero (0000 in the 8-4-2-1 code), if the digit group $W_k^j$ represents an even decimal digit; and the carries $C_k^j$ as binary number to five (0101 in the 8-4-2-1 code) if the digit group $W_k^j$ represents an odd decimal digit.

Thus digit groups $W_k^j$ representing 0, 2, 4, 6, or 8, in the 8-4-2-1 code where $W_k^1=0$, provide digit groups $Z_k^j$ equal to the carries $C_k^j$, and digit groups $W_k^j$ representing 1, 3, 5, 7, or 9, in the 8-4-2-1 code where $W_k^1=1$, provide digit groups $Z_k^j$ equal to the carries $C_k^j$ added to 0101. It is apparent, then, that to form the times five digits $Z_k^j$ in the 8-4-2-1 code it is only necessary to specify the input digits $W_k^1$ and the carry representing digits $W_{k-1}^4$, $W_{k-1}^3$, and $W_{k-1}^2$ respectively equal to the carries $C_k^3$, $C_k^2$, and $C_k^1$. A complete "truth" table may thus be provided for the fives multiplication operation in terms of this variable as is indicated in Table I below, where a binary 1 and a binary 0 are represented in the table by a 1 and 0, respectively.

*Table I*

| Binary carry digits | ------ | $C_k^3$ | $C_k^2$ | $C_k^1$ | Five's multiple digits | | | | Rule |
|---|---|---|---|---|---|---|---|---|---|
| Binary input digits | $W_k^1$ | $W_{k-1}^4$ | $W_{k-1}^3$ | $W_{k-1}^2$ | $Z_k^4$ | $Z_k^3$ | $Z_k^2$ | $Z_k^1$ | |
| Decimal values: | | | | | | | | | |
| (0, 2, 4, 6, or 8) | 0 | 0 | 0 | 0 | 0 | 0 | 0 | 0 | 1 |
| (0, 2, 4, 6, or 8) | 0 | 0 | 0 | 1 | 0 | 0 | 0 | 1 | 2 |
| (0, 2, 4, 6, or 8) | 0 | 0 | 1 | 0 | 0 | 0 | 1 | 0 | 3 |
| (0, 2, 4, 6, or 8) | 0 | 0 | 1 | 1 | 0 | 0 | 1 | 1 | 4 |
| (0, 2, 4, 6, or 8) | 0 | 1 | 0 | 0 | 0 | 1 | 0 | 0 | 5 |
| (1, 3, 5, 7, or 9) | 1 | 0 | 0 | 0 | 0 | 1 | 0 | 1 | 6 |
| (1, 3, 5, 7, or 9) | 1 | 0 | 0 | 1 | 0 | 1 | 1 | 0 | 7 |
| (1, 3, 5, 7, or 9) | 1 | 0 | 1 | 0 | 0 | 1 | 1 | 1 | 8 |
| (1, 3, 5, 7, or 9) | 1 | 0 | 1 | 1 | 1 | 0 | 0 | 0 | 9 |
| (1, 3, 5, 7, or 9) | 1 | 1 | 0 | 0 | 1 | 0 | 0 | 1 | 10 |

Table I is derived on the basis of the above discussed general principles; i. e. (1) the carry signals $C_k^3$, $C_k^2$, and $C_k^1$ representing four-unit, two-unit, and one-unit carries, respectively, are equal to the binary digit signals $W_{k-1}^4$, $W_{k-1}^3$, and $W_{k-1}^2$, respectively, in the next lower order binary digital place, and (2) the five's multiple digits $Z_k^4$, $Z_k^3$, $Z_k^2$, and $Z_k^1$ are equal to the binary sum of decimal 0 (0000 in the 8-4-2-1 binary code) and the carry signals $C_k^3$, $C_k^2$, and $C_k^1$ when the digit signal $W_k^1$ is equal to 0, and the binary sum of decimal 5 (0101 in the 8-4-2-1 code) and the carry signals $C_k^3$, $C_k^2$, and $C_k^1$ when the input signal $W_k^1$ has a 1 value.

In Table I, the furthest column on the left indicates the possible decimal value of the input digits $W_k^1$, $W_k^2$, $W_k^3$, and $W_k^4$ for two possible values of $W_k^1$, i. e. when $W_k^1=0$ and when $W_k^1=1$. Thus when $W_k^1=0$, the decimal value of the input digits may be 0, 2, 4, 6, or 8, and when $W_k^1=1$, the possible decimal value of the input digits is 1, 3, 5, 7, or 9. Since there are ten useable combinations of the input digits $W_k^1$, $W_k^2$, $W_k^3$, and $W_k^4$ in a binary-coded decimal system, and since the least significant binary digit $W_k^1$ is equal to 0 for five of the combinations and is equal to 1 for the other five combinations, the second column from the left in the table lists five 0's and five 1's for $W_k^1$. The next three columns to the right in the table indicate all possible combinations of values for the input signals $W_{k-1}^4$, $W_{k-1}^3$, and $W_{k-1}^2$ in the preceding binary place. The possible combinations of signals $W_{k-1}^4$, $W_{k-1}^3$, and $W_{k-1}^2$ are listed twice; once for the condition that $W_{k-1}=0$, and again for the condition that $W_k^1=1$. The next four columns to the right list the values for the fives' multiple digits $Z_k^4$, $Z_k^3$, $Z_k^2$, and $Z_k^1$ corresponding to the values for the signals $W_k^1$, $W_{k-1}^4$, $W_{k-1}^3$, and $W_{k-1}^2$. It should be noted that the carry signal designations $C_k^3$, $C_k^2$, and $C_k^1$ appear above the signal designations $W_{k-1}^4$, $W_{k-1}^3$, and $W_{k-1}^2$, respectively, indicating their equality. The last column on the right hand edge of the table identify the rows or rules of the table.

Table I is derived as follows: All possible combinations of the input variables $W_{k-1}^2$, $W_{k-1}^3$, and $W_{k-1}^4$ are first indicated in an orderly fashion for $W_k^1=0$ and again for $W_k^1=1$. This is accomplished by assuming the values of all 0's for the first or uppermost row, designated rule 1. The second row from the top, rule 2, is then obtained by adding 1 in a binary fashion to signal $W_{k-1}^2$. This is repeated for each row until all five possibilities for $W_k^1=0$ are obtained, utilizing the principle that $W_{k-1}^2$ is the least significant signal, $W_{k-1}^3$ the next-to-the-least significant signal, and $W_{k-1}^4$ the most significant signal. The above process is then repeated for the lowest five rows, i. e., rules 6 to 10, of the table where $W_k^1=1$ thus completing columns $W_k^1$, $W_{k-1}^4$, $W_{k-1}^3$, and $W_{k-1}^2$.

The manner of deriving the values for five's multiple digits of columns $Z_k^4$, $Z_k^3$, $Z_k^2$, and $Z_k^1$ of Table I will now be explained. For those rows where $W_k^1=0$, i. e., rules 1 to 5, the values for $Z_k^1$, $Z_k^2$, and $Z_k^3$ are filled in as equal to the corresponding values for $W_{k-1}^2$, $W_{k-1}^3$, and $W_{k-1}^4$, respectively, and column $Z_k^4$ is completed with all 0's. For those rows where $W_k^1=1$, i. e., rules 5 to 10, columns $Z_k^1$, $Z_k^2$, $Z_k^3$, and $Z_k^4$ are completed by entering for each row the binary sum of decimal 5, expressed binarily as 0101 in the 8–4–2–1 code, and the corresponding values of $W_{k-1}^2$, $W_{k-1}^3$, and $W_{k-1}^4$. As an example, consider the lowermost row or rule 10 of the table. The values for signals $Z_k^1$, $Z_k^2$, $Z_k^3$, and $Z_k^4$ are obtained by adding in a binary fashion the binary number 100 (for $W_{k-1}^4$, $W_{k-1}^3$, and $W_{k-1}^2$) and decimal 5 written binarily as 0101 producing the binary sum 1001.

The derivation of logical Boolean equation for $Z_k^1$, $Z_k^2$, $Z_k^3$, and $Z_k^4$ follows from a utilization of well known principles of Boolean logic.

Logical Boolean algebraic equations will be frequently employed in this discussion for explaining the mechanization of circuits employing "and" and "or" circuits or gates which correspond directly to the logical equations. Such circuits are well known in the art, typical circuits being described in detail in U. S. Patent No. 2,644,887, filed December 18, 1950, entitled "Synchronizing Generator" by A. E. Wolfe, Jr. Regardless of structural variations, the functional characteristics of these logical circuits remain substantially constant in the art, i. e., a logical "and" circuit produces an output signal only when signals are simultaneously applied to all the inputs, and a logical "or" circuit produces an output signal when a signal is applied to at least one of its inputs.

The manner in which a logical expression for $Z_k^1$ may be derived from Table I will now be explained in detail. From Table I, it is seen that $Z_k^1$ has a 1 value on rows or rules 2, 4, 6, 8, and 10, and a 0 value for rules 1, 3, 5, 7, and 9. Considering first rules 2 and 4, i. e., when $W_k^1=0$, $Z_k^1=1$ only when $W_{k-1}^2=1$. Thus the logical expression $Z_k^1=\overline{W}_k^1.C_k^1$ defines signal $Z_k^1$ for rules 2 and 4 of the table, where the dot (.) represents the logical "and" proposition. Considering next the rules wherein $W_k^1=1$, it is noted from the table that $Z_k^1=1$ only when $W_{k-1}^2=0$, i. e., rules 6, 8, and 10. Thus rules 6, 8, and 10 are satisfied by the logical expression $$Z_k^1=W_k^1.\overline{W}_{k-1}^2$$

By logically adding the above two expressions for $Z_{k1}$, a combined function expressing all conditions where $Z_k^1=1$, i. e., rules 2, 4, 6, 8, and 10, may be written as:

$$\begin{aligned} Z_k^1 &= \overline{W}_k^1.W_{k-1}^2+W_k^1.\overline{W}_{k-1}^2 \\ &= \overline{W}_k^1.C_k^1+W_k^1.\overline{C}_k^1 \end{aligned}$$

where the dot (.) and the plus (+) represent the logical "and" and "or" functions, respectively, the bar (−) over the symbol of a signal indicates the complement of the signal, and where $C_k^1$ is substituted for $W_{k-1}^2$ in the second expression above. According to this function, then, the digit $Z_k^1$ is equal to 1 if either digits $W_k^1$ "and" $W_{k-1}^2$ are respectively 0 "and" 1, "or" if these digits are respectively 1 "and" 0.

In precisely the same manner as utilized for deriving the above expression for $Z_k^1$, the other five's multiple digits $Z_k^2$, $Z_k^3$, and $Z_k^4$ may be found to be representable by the functions:

$$\begin{aligned} Z_k^2 &= \overline{W}_k^1.C_k^2+W_k^1.(C_k^2.\overline{C}_k^1+\overline{C}_k^2.C_k^1) \\ &= C_k^2.(\overline{W}_k^1+\overline{C}_k^1)+\overline{C}_k^2.W_k^1.C_k^1 \\ &= W_{k-1}^3.(\overline{W}_k^1+\overline{W}_{k-1}^2)+\overline{W}_{k-1}^3.W_k^1.W_{k-1}^2 \end{aligned}$$

$$\begin{aligned} Z_k^3 &= \overline{W}_k^1.C_k^3+W_k^1.\overline{C}_k^3.(\overline{C}_k^2+\overline{C}_k^1) \\ &= \overline{W}_k^1.C_k^3+W_k^1.(\overline{C}_k^3.\overline{C}_k^2+C_k^2.\overline{C}_k^1) \\ &= \overline{W}_k^1.W_{k-1}^4+W_k^1.(\overline{W}_{k-1}^4.\overline{W}_{k-1}^3+W_{k-1}^3.\overline{W}_{k-1}^2) \end{aligned}$$

$$\begin{aligned} Z_k^4 &= W_k^1.(C_k^2.C_k^1+C_k^3) \\ &= W_k^1.(W_{k-1}^3.W_{k-1}^2+W_{k-1}^4) \end{aligned}$$

It is possible to mechanize a five's multiple generator directly as a function of the input signals representing the digits $W_k^j$ as indicated by the above functions. This may be done in the manner fully explained in the above-mentioned copending application for "Electronic Multiple Product Generators"; the general technique being to formulate all of the desired product digits simultaneously and to shift them forward through the product generator flip-flops. While this procedure provides a very satisfactory circuit for generating products which are successive powers of two as in the copending application, it results in an inefficient utilization of flip-flops and gating circuit elements where only a single product is to be generated. This is especially true where it is necessary to utilize the input signals again in later operations as in the successive cycles of operations in multiplication by multidigit multipliers. It becomes very important in many applications, therefore, that the flip-flops providing the input signals operate only to shift the input signals so that they may be utilized for later operations.

According to the present invention, the basic defining equations for $Z_k^2$, $Z_k^3$, and $Z_k^4$ are rewritten as functions of $Z_k^1$, $Z_k^2$, and $Z_k^3$, respectively so that these digits may be successively formed in time through a single product digit generating flip-flop. This technique makes it possible to utilize all flip-flops providing the input signals in a shifting stage which, for example, may be part of the multiplicand register circulation path. As a result, it can also be established, that the total number of gating circut elements required is considerably reduced over the number required to simultaneously generate all digits and shift them forward in a shifting and correcting register. The functions for $Z_k^2$, $Z_k^3$, and $Z_k^4$ may then be redefined as follows:

$$\begin{aligned} Z_k^2 &= \overline{W}_k^1.C_k^2+W_k^1.(\overline{C}_k^2.\overline{Z}_k^1+C_k^2.Z_k^1) \\ &= \overline{W}_k^1.C_k^2+W_k^1.\overline{C}_k^2.\overline{Z}_k^1+C_k^2.Z_k^1 \\ &= \overline{W}_k^1.W_{k-1}^3+W_k^1.\overline{W}_{k-1}^3.\overline{Z}_k^1+W_{k-1}^3.Z_k^1 \end{aligned}$$

$$\begin{aligned} Z_k^3 &= \overline{W}_k^1.C_k^3+W_k^1.(\overline{C}_k^3.\overline{C}_k^2+Z_k^2) \\ &= \overline{W}_k^1.W_{k-1}^4+W_k^1.(\overline{W}_{k-1}^4.\overline{W}_{k-1}^3+Z_k^2) \\ &= \overline{W}_k^1.W_{k-1}^4+W_k^1.\overline{W}_{k-1}^4.(Z_k^2+Z_k^1) \end{aligned}$$

$$Z_k^4=W_k^1.\overline{Z}_k^3$$

The above expressions are derived directly from Table I in a manner similar to that previously described. For example, in deriving the expression for $Z_k^2$, it is noted in Table I that $Z_k^2$ has a value of 1 for rules 3, 4, 7, and 8, and has a 0 value for all other rules. Considering first rules 3 and 4, i. e., when $W_k^1=0$, it is seen that only on rules 3 and 4 is $W_k^1=0$ and $C_k^2$ (or its equivalent $W_{k-1}^3$) equal to 1. Thus rules 3 and 4 may be distinguished by the logical expression $Z_k^2=\overline{W}_k^1.C_k^2$. When $W_k^1=1$, $C_k^2$ and $Z_k^1$ are both 0 level signals on rule 7, and are both 1 level signals on rule 8. Thus rules 7 and 8 may be distinguished by the expression $$Z_k^2=W_k^1(\overline{C}_k^2.\overline{Z}_k^1=C_k^2.Z_k^1)$$

where the parentheses () indicate the logical "and" function. Combining the two above expressions for $Z_k^2$ by logical addition, the expression $$Z_k^2=\overline{W}_k^1.C_k^2+W_k^1.(\overline{C}_k^2.Z_k^1+C_k^2.Z_k^1)$$

is derived. The above expression readily reduces to the expression $$Z_k^2=\overline{W}_k^1.C_k^2+W_k^1.\overline{C}_k^2.\overline{Z}_k^1+C_k^2.Z_k^1$$

by the use of well known logical Boolean algebraic rules. By substituting the equality $Z_{k-1}^3$ for $C_k^2$ in the above expression, the logical equation $$Z_k^2=\overline{W}_k^1.W_k^3+W_k^1.\overline{W}_{k-1}^3.\overline{Z}_k^1+W_{k-1}^3.Z_k^1$$

is formed. The above logical equations for $Z_k^3$ and $Z_k^4$ are derived in precisely the same manner as above described and further explanation of the derivation of these expressions is deemed unnecessary.

One form of mechanization according to the rewritten equations above is illustrated in Fig. 1 wherein five flip-flops F1, F2, F3, F4, and F5 are included in shifting stage 100 producing corresponding complementary signals $F^1$, $\bar{F}^1$; $F^2$, $\bar{F}^2$; $F^3$, $\bar{F}^3$; $F^4$, $\bar{F}^4$; and $F^5$, $\bar{F}^5$. An output flip-flop F6, producing signals $F^6$ and $F^6$ is included in the five's multiple digit producing stage 200 and has input circuits 1F6 and 0F6 such that pulses applied separately to input circuits 1F6 and 0F6 set flip-flop F6 to stable states representing binary 1 and 0 respectively, and the simultaneous application of pulses to both input circuits 1F6 and 0F6 "triggers" flip-flop F6 or causes it to assume a complementary stable state.

The operation of shifting stage 100 is such that the digit $W_k^1$ is registered in flip-flops F1, F2, F3, and F4 respectively during the first, second, third, and fourth digit time intervals of operation represented respectively by signals $T^1$, $T^2$, $T^3$, $T^4$. In a similar fashion it is apparent that the digits $W_k^1$, $W_k^2$, $W_k^3$, and $W_k^4$ appear serially in flip-flop F1 during digit time intervals $T^1$, $T^2$, $T^3$, and $T^4$, respectively.

The binary input digit registered in each of the register flip-flops $F^1$, $F^2$, $F^3$, $F^4$, and $F^5$, and the five's digit registered in the output flip-flop $F^6$ for each of the time intervals $T^1$ to $T^4$, inclusive, are illustrated in Table II*a* below.

*Table IIa*

| Time intervals | Section (*a*) Shifting stage flip-flops | | | | | Section (*b*) Output flip-flop |
|---|---|---|---|---|---|---|
| | $F^1$ | $F^2$ | $F^3$ | $F^4$ | $F^5$ | $F^6$ |
| $T^1$ | $W_k^1$ | $W_{k-1}^4$ | $W_{k-1}^3$ | $W_{k-1}^2$ | $W_{k-1}^1$ | $Z_{k-1}^4$ |
| $T^2$ | $W_k^2$ | $W_k^1$ | $W_{k-1}^4$ | $W_{k-1}^3$ | $W_{k-1}^2$ | $Z_k^1$ |
| $T^3$ | $W_k^3$ | $W_k^2$ | $W_k^1$ | $W_{k-1}^4$ | $W_{k-1}^3$ | $Z_k^2$ |
| $T^4$ | $W_k^4$ | $W_k^3$ | $W_k^2$ | $W_k^1$ | $W_{k-1}^4$ | $Z_k^3$ |

Table II*a* is divided into two sections, section (*a*) defining the binary input digits registered in the shifting stage flip-flops $F^1$ to $F^5$ for each time interval $T^1$ to $T^4$, and section (*b*) defining the five's multiple binary digits registered in the output flip-flop $F^6$ for the time intervals $T^1$ to $T^4$. The time intervals $T^1$ to $T^4$ are indicated on the extreme left-hand column of the table.

The timing of the operation of the embodiment of Fig. 1 and the binary input signals required for the various input circuits, are shown in Table II*b* appearing below. Table II*b* is formed by combining Tables I and Table II*a* above. Thus, Table II*b* comprises a lower section essentially reproducing Table I and an upper section indicating, in a slightly altered fashion, the information illustrated in Table II*a* above.

Table II*b* is divided into three major sections; section (*a*) indicating the binary digits stored in the shifting stage flip-flops F1 to F5, inclusive, during time intervals $T^1$ to $T^4$; section (*b*) indicating the data stored in the output flip-flop F6 during these time intervals; and section (*c*) illustrating the input signal requirements of the output flip-flop F6. In the table, the time intervals $T^1$, $T^2$, $T^3$, and $T^4$ are indicated in the upper four rows of the farthest column to the left of the table, and appertain to the corresponding rows of sections (*a*) and (*b*) of the table. The binary digits or variables are indicated on the fifth row from the top of the table as indicated. The row or rule numbers of the lower ten rows of the table are indicated in the furthermost column on the left of the table. Section (*c*), listing the input signal requirements of flip-flop F6, is divided into three major sections, a first section indicating the input signal requirements for time interval $T^2$, a second section indicating the input signal requirements for time interval $T^3$, and a third section indicating input signal requirements for time interval $T^4$. Each of these time interval requirements are further divided into a true or 1 input requirement and a false or 0 input requirement designated 1F6 and 0F6, respectively, at the head of the appropriate columns.

Rows or rules 1 to 10 of section (*a*) of Table II*b* above indicate all possible combinations of input signals $W_k^1$, $W_{k-1}^4$, $W_{k-1}^3$, and $W_{k-1}^2$; and rules 1 to 10 of section (*b*) indicate the corresponding values of the five's multiple output digits $Z_k^4$, $Z_k^3$, $Z_k^2$, and $Z_k^1$.

Since rows 1 to 10 of sections (*a*) and (*b*) of Table II*b* are duplications of rules 1 to 10 of Table I above, no further explanation of the derivation of this portion of the table is considered necessary.

The upper portions (the uppermost four rows) of sections (*a*) and (*b*) of the Table II*b* are derived from Table II*a* above. Each column lists the flip-flop in which the corresponding binary digit of the column is stored for the time intervals $T^1$ to $T^4$. Thus noting the furthest column on the left of the table, during time $T^1$ the input binary digit $W_k^1$ is stored in the F1 flip-flop; during time $T^2$, $W_k^1$ is stored in flip-flop F2; and during time intervals $T^3$ and $T^4$, $W_k^1$ is stored in flip-flops F3 and F4, respectively. Similarly the binary digits $W_{k-1}^4$, $W_{k-1}^3$, $W_{k-1}^2$, $Z_k^4$, $Z_k^3$, $Z_k^2$, and $Z_k^1$ are stored in the flip-flops listed within the corresponding column at the time intervals as indicated at the left of the table. For example, the five's multiple digit $Z_k^2$ is stored in the output flip-flop F6 during time interval $T^3$ as indicated by reference to the second row from the right of section (*b*) of the table.

As will be more fully explained later on, the symbols 1F6 and 0F6 appearing at the heads of the columns of

*Table IIb*

| | Section (*a*) Shifting stage flip-flops | | | | Section (*b*) Output flip-flop | | | | Section (*c*) Flip-flop F6 input signal requirements | | | | | |
|---|---|---|---|---|---|---|---|---|---|---|---|---|---|---|
| Time Intervals: | | | | | | | | | | | | | | |
| $T^4$ | F4 | F5 | ---- | ---- | ---- | F6 | ---- | ---- | | | | | | |
| $T^3$ | F3 | F4 | F5 | ---- | ---- | ---- | F6 | ---- | | | | | | |
| $T^2$ | F2 | F3 | F4 | F5 | ---- | ---- | ---- | F6 | | | | | | |
| $T^1$ | F1 | F2 | F3 | F4 | ---- | ---- | ---- | ---- | For time $T^2$ | | For time $T^3$ | | For time $T^4$ | |
| Binary digits | $W_k^1$ | $W_{k-1}^4$ | $W_{k-1}^3$ | $W_{k-1}^2$ | $Z_k^4$ | $Z_k^3$ | $Z_k^2$ | $Z_k^1$ | 1F6 | 0F6 | 1F6 | 0F6 | 1F6 | 0F6 |
| Rule numbers: | | | | | | | | | | | | | | |
| 1 | 0 | 0 | 0 | 0 | 0 | 0 | 0 | 0 | 0 | ---- | 0 | ---- | 0 | ---- |
| 2 | 0 | 0 | 0 | 1 | 0 | 0 | 0 | 1 | ---- | 1 | 0 | ---- | 0 | ---- |
| 3 | 0 | 0 | 1 | 0 | 0 | 0 | 1 | 0 | 1 | ---- | ---- | 1 | 0 | ---- |
| 4 | 0 | 0 | 1 | 1 | 0 | 0 | 1 | 1 | ---- | 0 | ---- | 1 | 0 | ---- |
| 5 | 0 | 1 | 0 | 0 | 0 | 1 | 0 | 0 | 0 | ---- | 1 | ---- | ---- | 1 |
| 6 | 1 | 0 | 0 | 0 | 0 | 1 | 0 | 1 | ---- | 1 | 1 | ---- | ---- | 1 |
| 7 | 1 | 0 | 0 | 1 | 0 | 1 | 1 | 0 | 1 | ---- | ---- | 0 | ---- | 1 |
| 8 | 1 | 0 | 1 | 0 | 0 | 1 | 1 | 1 | ---- | 0 | ---- | 0 | ---- | 1 |
| 9 | 1 | 0 | 1 | 1 | 1 | 0 | 0 | 0 | 0 | ---- | 0 | ---- | 1 | ---- |
| 10 | 1 | 1 | 0 | 0 | 1 | 0 | 0 | 1 | ---- | 1 | 0 | ---- | 1 | ---- |

section (c) of the table identify the input requirements of the flip-flop F6. Briefly stated at present 1F6 and 0F6 indicate input requirements of the 1 and 0 input circuits, respectively, of flip-flops F6. A 1 in a column indicates that a triggering or clock pulse must be applied to the corresponding input, and a 0 in a column indicates that a triggering pulse must not be applied to the input. A blank (neither a 1 or a 0) indicates that a triggering pulse is not necessary but is permissible at the corresponding input.

By a comparison of the previous state of flip-flop F6 with the desired present state of the flip-flop, the values for 1F6 and 0F6 may be readily ascertained. For example, in deriving the input signal requirements for flip-flop F6 during time $T^2$ reference is made to the furthest column to the right of section (b) of the table to ascertain the present state (at $T^2$ time) of the flip-flop. The next succeeding or desired future state of flip-flop F6 is then determined by reference to the second column to the left of section (b) of the table, i. e., the column indicating the data stored in flip-flop F6 during $T^3$ time. Thus considering rule 1 of the table, it is noted that flip-flop F6 stores a binary 0 during $T^2$ time and again a binary 0 during $T^3$ time. Therefore since flip-flop F6 is in the 0 state during time $T^2$ and time $T^3$, there is no need to trigger the flip-flop. A signal to the 1 input of the flip-flop, however, must be inhibited, thus, a 0 is entered in row 1 of the 1F6 column for time $T^2$. Next noting rule 2 of the table for the same time intervals, it is noted that flip-flop F6 stores a binary 1 during time $T^2$ and stores a binary 0 during time $T^3$. Thus, flip-flop F6 must be triggered from the 1 state to the 0 state at the end of time interval $T^2$. This is indicated in the table by placing a 1 in column 0F6 on the corresponding row of the table for time $T^2$. It is noted, therefore, that the manner of completing section (c) of Table II*b* above is a straightforward procedure directly derivable from the data of section (b) of the table. In precisely a similar manner as above described section (c) of the table is completed, further explanation of the derivation of each of the 1's and 0's in this section of the table being considered superfluous.

The input requirements for flip-flop F6 indicated in section (c) of Table II*b* above are indicated in Table II*c* below in terms of the bistable states or binary digits stored in the shifting register flip-flops F2, F3, and F4, the uppermost row, in section (a) of Table II*c*. Similarly, during $T^2$ time, flip-flops F2, F3, and F4 register the same binary values on rows 3 and 4, rows 6 and 7, and rows 8 and 9 of Table II*b* and may therefore be combined to form the second, fourth, and fifth rows from the top, respectively, of section (a) of Table II*c*. By a process essentially identical to that explained above for the derivation of section (a) of Table II*c*, sections (b) and (c) of the table are completed.

Before considering the logical equations defining gating circuit 10F6 controlling flip-flop F6 it is important to understand the various types of mechanizations which may be utilized. According to one type of equation, the sequence of stable states of the flip-flop are directly defined so that the value of the equation at a particular time indicates the next flip-flop setting. This type of function may be referred to as a "setting" function and requires means to set the controlled flip-flop to 0 when the controlling gating circuit produces, a 0-representing signal. This operation is effected, in the embodiment of Fig. 1, by complementer *Co* in gating circuit 10F6. Complementer circuit *Co* provides separate signals for the 1 and 0 input circuits of flip-flop F6 when the output signal produced by gating circuit 10F6 has 1 and 0 representing levels respectively. It is also possible to achieve the "setting" operation by utilizing an "overriding" flip-flop which is continuously set to 0 when the input gating signal is 0 by pulses applied to its 0 input circuit and is set to 1 when the gating circuit signal is 1 because the 1 input signal "overides" the simultaneously applied 0 input signal.

According to a second type of equation, the conditions for changing the flip-flop stable state or "triggering" the flip-flop are established. When a changing function is utilized, a conventional flip-flop is employed and the gating circuit signal is applied to both 1 and 0 input circuits of the flip-flop.

In many situations, it is desirable to separate the changing type of equation into two partial-changing functions which separately define the conditions for changing the associated flip-flop stable state from 0 to 1, and from 1 to 0. The partial-changing functions are particularly useful where the equations include the output signals of the flip-flop to be controlled. In this case the partial-changing functions may be simplified according to rules which are briefly considered below and fully described in the following copending U. S. patent applications, all of which are assigned to the same assignee as this application.

Table II*c*

| Rule | Section (a) $T^2=1$ | | | | | Rule | Section (b) $T^3=1$ | | | | | Rule | Section (c) $T^4=1$ | | |
|---|---|---|---|---|---|---|---|---|---|---|---|---|---|---|---|
| | F2 | F3 | F4 | 1F6 | 0F6 | | F3 | F4 | F5 | 1F6 | 0F6 | | F4 | 1F6 | 0F6 |
| 1, 2 | 0 | 0 | 0 | 0 | 1 | 1, 2 | 0 | 0 | 0 | 0 | ----- | 1–5 | 0 | 0 | 1 |
| 3, 4 | 0 | 0 | 1 | 1 | 0 | 3, 4 | 0 | 0 | 1 | ----- | 1 | 6–10 | 1 | 1 | 1 |
| 5 | 0 | 1 | 0 | 0 | ----- | 5 | 0 | 1 | 0 | 1 | ----- | ----- | ----- | ----- | ----- |
| 6, 7 | 1 | 0 | 0 | 1 | 1 | 6, 7 | 1 | 0 | 0 | 1 | 0 | ----- | ----- | ----- | ----- |
| 8, 9 | 1 | 0 | 1 | 0 | 0 | 8, 9 | 1 | 0 | 1 | 0 | 0 | ----- | ----- | ----- | ----- |
| 10 | 1 | 1 | 0 | ----- | 1 | 10 | 1 | 1 | 0 | 0 | ----- | ----- | ----- | ----- | ----- |

Table II*c* above is divided into three sections, section (a) for time interval $T^2$, section (b) for time interval $T^3$, and section (c) for time interval $T^4$. Each of the above sections includes, in addition to columns F2, F3, F4, 1F6, and 0F6, a column listing the corresponding rows or rule numbers of Table II*b*.

Table II*c* is derived directly from Table II*b* by combining the rows of Table II*b* wherein the data stored in flip-flops F2, F3, and F4 are the same for a given time interval. Thus in Table II*b* it is noted that flip-flops F2, F3, and F4 each store a binary 0 during time $T^2$ for rules 1 and 2. Therefore rules 1 and 2 for time $T^2$ of Table II*b* are combined to form a single row, i. e., (1) Serial No. 327,567 for "Binary-Coded Flip-Flop Counters" by E. C. Nelson, filed December 20, 1952, now Patent No. 2,816,223;

(2) Serial No. 327,131 for "Binary-Coded, Flip-Flop Counters" by R. R. Johnson, filed December 20, 1952; and (3) Serial No. 378,307 for "Result-From-Carry Adder-Subtracters" by J. V. Blankenbaker, filed September 3, 1953.

The "setting," "changing," and simplified partial-changing functions for controlling a flip-flop F*j* (*j* representing and flip-flop) are designated respectively by the notation: $ToFj=$; $1Fj=0Fj=$; and separate functions $1Fj=$ and $0Fj=$, respectively.

As is more fully explained in the above-mentioned references (1) and (2), any flip-flop function may be written in the form:

$$toFj=\overline{F}j.G+Fj.\overline{H}$$

which may be reduced to the simplified partial-changing functions:

$$\frac{1Fj=G}{0Fj=H}$$

G and H being any functions of variables other than $F^j$ and $\overline{F}^j$, where $F^j$ and $\overline{F}^j$ are the signals produced by flip-flop $F^j$.

The flip-flop stable state transformation may also be represented by the function:

$$F'=\overline{F}.G+F.\overline{H}$$

where F′ represents the new flip-flop signal and the 1 and 0 input functions are:

$$\frac{1F=G}{0F=H}$$

Analysis of the transformation function indicates that if the flip-flop signal is 0 ($\overline{F}=1$), F′ is equal to the function G; and that if the flip-flop signal was previously 1, the new signal F′ is equal to $\overline{H}$. This transformation is indicated in Table III below:

*Table III*

| G | H | F | F′ |
|---|---|---|---|
| 0 | 0 | 0 | 0 |
| 0 | 0 | 1 | 1 |
| 0 | 1 | 0 | 0 |
| 0 | 1 | 1 | 0 |
| 1 | 0 | 0 | 1 |
| 1 | 0 | 1 | 1 |
| 1 | 1 | 0 | 1 |
| 1 | 1 | 1 | 0 |

In many situations, as in the case of the present invention, it is necessary to formulate the unknown input functions G and H where the desired transformation F to F′ is known. In this case the corollary of the above-stated proposition is utilized, namely that when F is originally 0 the function G is equal to F′, and when F is originally 1, the function $\overline{H}$ is equal to F′ or H is equal to $\overline{F}'$. This corollary is utilized in deriving the 1 and 0 input functions for flip-flop F6 during digit time intervals represented by $T^2$, $T^3$, $T^4$, as indicated in Tables II*b* and II*c*.

As an illustrative application of the corollary consider the input function 1F6 and 0F6 for flip-flop F6 during the digit time interval represented by signal $T^2$. During this time interval the variable $Z_k^2$ is to be formed and entered into flip-flop F6 where previously the digit $Z_k^1$ had been. Thus, the initial state of flip-flop F6 represents the variable $Z_k^1$ and the desired new state F6′ is to be representative of the digit $Z_k^2$. According to the above discussed rule, then, the input function for input circuit 1F6, or the function G, is equal to the variable $Z_k^2$ when flip-flop F6 was originally set to 0 as indicated by the 0's for the variable $Z_k^1$. Thus, opposite to each 0 for the variable $Z_k^1$, the digit appearing in the 1F6 function is equal to the digit $Z_k^2$. In a similar manner, the function applied to circuit 0F6 is equal to the complement of the digit $Z_k^2$ wherever flip-flop F6 was originally in a 1-representing state as indicated by digit $Z_k^1$ having a value of 1. Thus, opposite each position where $Z_k^1$ is 1, the input function 0F6 has a value complementary to the value of $Z_k^2$.

By utilizing the techniques employed in deriving the functions for $Z_k^1$, $Z_k^2$, $Z_k^3$, and $Z_k^4$ above from Table I, a set of flip-flop functions for flip-flop F6 may be derived from Table II*c* in accordance with the above discussed principles of flip-flop input function requirements. Thus, a complete set of flip-flop functions for flip-flop F6 may be derived as follows:

$$toF6=T^1.(\overline{F^1}.F^4+F^1.\overline{F^4})+T^2.(\overline{F^2}.F^4+F^2.\overline{F^4}.\overline{F^6}+F^4.F^6)+T^3.(\overline{F^3}.F^4+F^3.F^6+F^3.\overline{F^4}.\overline{F^5})+T^4.F^4.\overline{F^6}$$

$$1F6=T^1.(\overline{F^1}.F^4+F^1.\overline{F^4})+T^2.(F^2.F^4+\overline{F^2}.\overline{F^4})+T^3.(\overline{F^3}.F^4+F^3.\overline{F^4}.\overline{F^5})+T^4.F_4$$

$$0F6=T^1.(\overline{F^1}.\overline{F^4}+F^1.F^4)+T^2.\overline{F^4}+T^3.\overline{F^3}.\overline{F^4}+T^4$$

While it is apparent that several mechanization forms may be utilized to define gating circuit 10F6, shown in Fig. 1, as an illustration gating circuit 10F6 is mechanized according to the following function:

$$(10F6)\quad toF6=(T^1.\overline{F^1}.F^4+T^1.F^1.\overline{F^4}+T^2.\overline{F^2}.F^4+T^2.F^2.\overline{F^4}.\overline{F^6}+T^2.F^4.F^6+T^3.\overline{F^3}.F^4+T^3.F^3.F^6+T^3.F^3.\overline{F^4}.\overline{F^5}+T^4.F^4.\overline{F^6}).Cp$$

where signal *Cp* is introduced as a synchronizing "and" condition.

Since the function utilized is a "setting" function a complementer circuit *Co* is utilized as indicated in Fig. 1. A suitable complementer circuit is described in U. S. patent application Serial No. 308,045 for "Complementary Signal Generating Networks" by D. L. Curtis, filed September 5, 1952, now Patent No. 2,812,451, and assigned to the same assignee as the present application.

Each "and" function in the defining function above is provided by an "and" circuit which responds to the signals indicated by the corresponding function and produces a 1-representing output signal when all applied input signals are 1-representing signals. Thus, the "and" functions $T^1.\overline{F}^1.F^4$, $T^1.F^1.\overline{F}^4$, and $T^2.\overline{F}^2.F^4$ are provided by "and" circuits 10F6–1, 10F6–2, and 10F6–3, responding to signals $T^1$, $\overline{F}^1$, $F^4$; $T^1$, $F^1$, $\overline{F}^4$; and $T^2$, $\overline{F}^2$, $F^4$ applied to separate input terminals, for producing 1-representing output signals when all applied signals are 1-representing signals. The "and" functions are combined in "or" circuit 10F6–4 which produces a 1-representing output signal when any one or more of the input "and" functions is 1.

"And" and "or" circuits are now well-known in the computer art and therefore it is not deemed necessary to consider such circuits in detail in this application. Examples of such circuits are shown on pages 37 to 45 of "High-Speed Computing Devices" by Engineering Research Associates, published in 1950 by McGraw-Hill Book Company, Inc., New York and London, and in an article entitled "Diode coincidence and mixing circuits in digital computers" by Tung Chang Chen, in volume 38 of "Proceedings of the Institute of Radio Engineers" on pages 511 through 514.

The operation of the embodiment of Fig. 1 is illustrated in Table IV, below, wherein the input number 967 (1001 0110 0111) is multiplied by 5 to provide the product 4835 (0100 1000 0011 0101). As indicated in Table IV the least significant binary digit of the product appears in flip-flop F6 at the time signal $T^2$ is equal to 1. If it is desired to operate the embodiment of Fig. 1 as a divide-by-two circuit, the signals produced by flip-flop F6 are considered as being shifted four binary digits in time so that the first decimal digit (5) read out is effectively divided by ten (providing .5).

*Table IV*

```
    9           6           7     F1 F2 F3 F4 F5     F6
|1  0  0  1|0  1  1  0|0  1  1  1|0  0  0  0          0       T1
   |1  0  0  1|0  1  1  0|0  1  1  1|0  0  0          1  |    T2
      |1  0  0  1|0  1  1  0|0  1  1  1|0  0          0  | 5  T3
         |1  0  0  1|0  1  1  0|0  1  1  1|0          1  |    T4
            |1  0  0  1|0  1  1  0|0  1  1  1|        0  |    T1
               |1  0  0  1|0  1  1  0|0  1  1         1  |    T2
                  |1  0  0  1|0  1  1  0|0  1         1  | 3  T3
                     |1  0  0  1|0  1  1  0|0         0  |    T4
                        |1  0  0  1|0  1  1  0|       0  |    T1
                           |1  0  0  1|0  1  1        0  |    T2
                              |1  0  0  1|0  1        0  | 8  T3
                                 |1  0  0  1|0        0  |    T4
                        |0  0  0  0|1  0  0  1|       1  |    T1
                           |0  0  0  0|1  0  0        0  |    T2
                              |0  0  0  0|1  0        0  | 4  T3
                                 |0  0  0  0|1        1  |    T4
                                                      0       T1
```

As indicated in the above considered functions for digits $Z_k^2$ and $Z_k^3$, several forms of mechanization are possible. In another embodiment of the present invention illustrated in Fig. 2 the digit $Z_k^3$ is produced as a function of both the digits $Z_k^2$ and $Z_k^1$ as defined in the function:

$$Z_k^3=\overline{W_k^1}.W_{k-1}^4+W_k^1.\overline{W_{k-1}^4}.(Z_k^2+Z_k^1)$$

Figure 2:
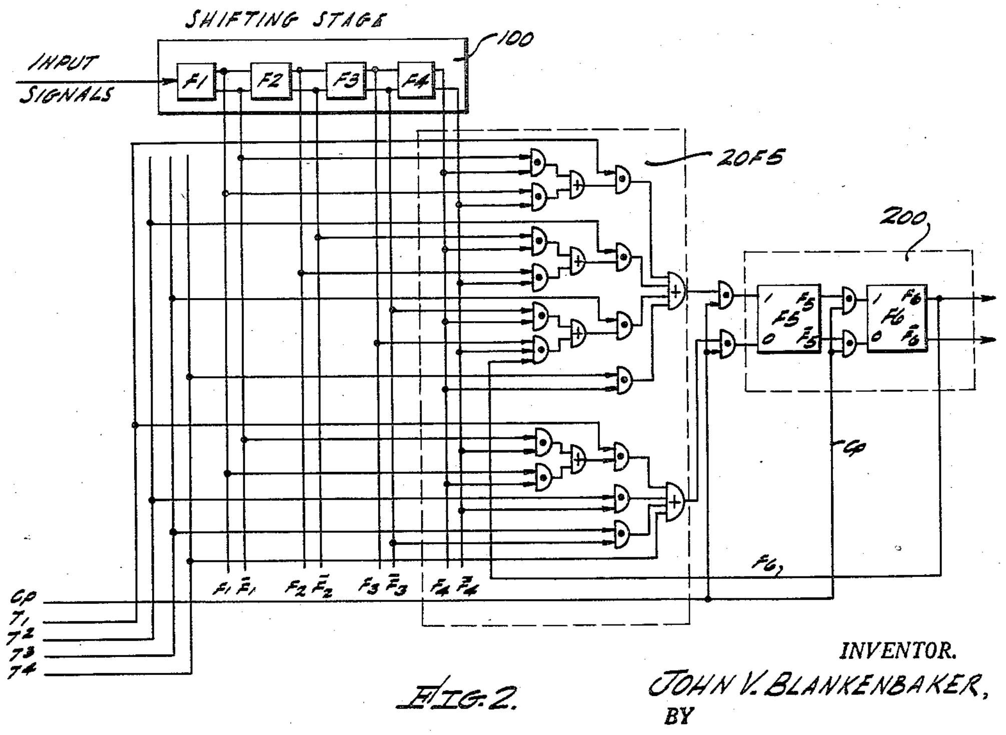
Fig. 2 is a schematic diagram of a five's multiple generator, according to the present invention, requiring two flip-flops in addition to a four flip-flop shifting stage.

In the embodiment of Fig. 2 only four flip-flops are included in shifting stage 100, namely, flip-flops F1, F2, F3, and F4 producing signals indicated above with regard to the embodiment of Fig. 1. On the other hand the five's multiple digit storage stage 200 includes two flip-flops F5 and F6 which are required in order to provide signals indicating the digits $Z_k^1$ and $Z_k^2$ during the formation of the digit $Z_k^3$. The five multiple digits as formed are entered into flip-flop F5 through controlling gating circuit 20F5. It will be noted that no complementer circuit is utilized since separate input signals are applied to the 1 and 0 input circuits of flip-flop F5. The mechanization functions defining circuit 20F5 are obtained from Tables V*a* and V*b* below.

Table V*a* is similar in construction to Table II*b* above in that the table is divided into a section (*a*) defining the binary digits stored in the shifting stage flip-flops F1, F2, F3, and F4; a section (*b*) defining the data stored in the output flip-flops F5 and F6; and a section (*c*) indicating the input requirements of flip-flop F5. The lower portion of sections (*a*) and (*b*) of the table is a reproduction of Table I above. Table V*b* is derived from Table V*a* in a manner similar to that utilized in deriving Table II*c* from Table II*b* above. Similarly, techniques for deriving the flip-flop functions from a table defining the flip-flop input requirements having been fully discussed in relation to Table II*c* above, no further explanation of the methods of deriving the following flip-flop functions for flip-flop F5 is considered necessary.

$$toF5=Z_k^j=T^1.(\bar{F}^1.F^4+F^1.\bar{F}^4+T^2.(\bar{F}^2.F^4+F^2.\bar{F}^4.\bar{F}^5+F^4.F^5)+T^3.\bar{F}^3.F^4+F^3.\bar{F}^4.(F^5+F^6)+T^4.F^4.\bar{F}^5$$

$$1F5=T^1.(\bar{F}^1.F^4+F^1.\bar{F}^4)+T^2.(\bar{F}^2.F^4+F^2.\bar{F}^4)+T^3.(\bar{F}^3.F^4+F^3.\bar{F}^4.F^6)+T^4.F^4$$

$$0F5=T^1.(\bar{F}^1.\bar{F}^4+F^1.F^4)+T^2.\bar{F}^4+T^3.\bar{F}^3+T^4$$

The embodiment of Fig. 2 illustrates the mechanization of a gating circuit providing separate input signals for the 1 and 0 input circuits of a flip-flop (flip flop F5). The mechanization functions utilized are:

$$1F5=[T^1.(\bar{F}^1.F^4+F^1.\bar{F}^4)+T^2.(\bar{F}^2.F^4+F^2.\bar{F}^4)+T^3.(\bar{F}^3.F^4+F^3.\bar{F}^4.F^6)+T^4.F^4].Cp \quad (20F5)$$

$$0F5=[T^1.(\bar{F}^1.\bar{F}^4+F^1\cdot F^4)+T^2.\bar{F}^4+T^3.\bar{F}^3+T^4].Cp$$

where again the clock pulse signal is introduced as a synchronizing "and" condition. The mechanization of the embodiment of Fig. 2 in accordance with these equa-

*Table Va*

| | Section (*a*) Shifting stage flip-flops | | | | Section (*b*) Output flip-flops | | | | Section (*c*) Flip-flop F5 input signal requirements | | | | | |
|---|---|---|---|---|---|---|---|---|---|---|---|---|---|---|
| Time interval: | | | | | | | | | For time $T^2$ | | For time $T^3$ | | For time $T^4$ | |
| $T^4$ | F4 | ------ | ------ | ------ | ------ | F5 | F6 | ------ | | | | | | |
| $T^3$ | F3 | F4 | ------ | ------ | ------ | ------ | F5 | F6 | | | | | | |
| $T^2$ | F2 | F3 | F4 | ------ | ------ | ------ | ------ | F5 | | | | | | |
| $T^1$ | F1 | F2 | F3 | F4 | ------ | ------ | ------ | ------ | | | | | | |
| Binary digits | $W_k^1$ | $W_{k-1}^4$ | $W_{k-1}^3$ | $W_{k-1}^2$ | $Z_k^4$ | $Z_k^3$ | $Z_k^2$ | $Z_k^1$ | 1F5 | 0F5 | 1F5 | 0F5 | 1F5 | 0F5 |
| Rule number: | | | | | | | | | | | | | | |
| 1 | 0 | 0 | 0 | 0 | 0 | 0 | 0 | 0 | 0 | ------ | 0 | ------ | 0 | ------ |
| 2 | 0 | 0 | 0 | 1 | 0 | 0 | 0 | 1 | ------ | 1 | 0 | ------ | 0 | ------ |
| 3 | 0 | 0 | 1 | 0 | 0 | 0 | 1 | 0 | 1 | ------ | ------ | 1 | 0 | ------ |
| 4 | 0 | 0 | 1 | 1 | 0 | 0 | 1 | 1 | ------ | 0 | ------ | 1 | 0 | ------ |
| 5 | 0 | 1 | 0 | 0 | 0 | 1 | 0 | 0 | 0 | ------ | 1 | ------ | ------ | 1 |
| 6 | 1 | 0 | 0 | 0 | 0 | 1 | 0 | 1 | ------ | 1 | 1 | ------ | ------ | 1 |
| 7 | 1 | 0 | 0 | 1 | 0 | 1 | 1 | 0 | 1 | ------ | ------ | 0 | ------ | 1 |
| 8 | 1 | 0 | 1 | 0 | 0 | 1 | 1 | 1 | ------ | 0 | ------ | 0 | ------ | 1 |
| 9 | 1 | 0 | 1 | 1 | 1 | 0 | 0 | 0 | 0 | ------ | 0 | ------ | 1 | ------ |
| 10 | 1 | 1 | 0 | 0 | 1 | 0 | 0 | 1 | ------ | 1 | 0 | ------ | 1 | ------ |

*Table Vb*

| Rule | $T^2=1$ | | | | | Rule | $T^3=1$ | | | | | Rule | $T^4=1$ | | |
|---|---|---|---|---|---|---|---|---|---|---|---|---|---|---|---|
| | F2 | F3 | F4 | 1F5 | 0F5 | | F3 | F4 | F6 | 1F5 | 0F5 | | F4 | 1F5 | 0F5 |
| 1, 2 | 0 | 0 | 0 | 0 | 1 | 1, 3 | 0 | 0 | 0 | 0 | 1 | 1–5 | 0 | 0 | 1 |
| 3, 4 | 0 | 0 | 1 | 1 | 0 | 2, 4 | 0 | 0 | 1 | 0 | 1 | 6–10 | 1 | 1 | 1 |
| 5 | 0 | 1 | 0 | 0 | ------ | 5 | 0 | 1 | 0 | 1 | ------ | ------ | ------ | ------ | ------ |
| 6, 7 | 1 | 0 | 0 | 1 | 1 | 6, 9 | 1 | 0 | 0 | 0 | 0 | ------ | ------ | ------ | ------ |
| 8, 9 | 1 | 0 | 1 | 0 | 0 | 7, 8 | 1 | 0 | 1 | 1 | 0 | ------ | ------ | ------ | ------ |
| 10 | 1 | 1 | 0 | ------ | 1 | 10 | 1 | 1 | 1 | 0 | ------ | ------ | ------ | ------ | ------ |

tions should be apparent from the examples considered above.

From the foregoing description it should now be apparent that the present invention provides an electronic five's multiple generator wherein an economical utilization of gating circuit elements is achieved by forming each binary digit as a function of the previously formed binary digit. It has been specifically pointed out that, according to the present invention, the five's multiple may be formed in a serial operation wherein the input signals are derived from a series of shifting stages and the generator itself requires only one or two additional flip-flops. It is thus apparent that the five's multiple generator may be readily introduced into a serial multiplication system with a minimum requirement of additional flip-flops and gating circuit elements.

While the invention has been described in detail in regard to a few specific embodiments it should be understood that many other variations are possible. For example, the flip-flop "setting," "changing," and "partial-changing" functions may be used interchangeably to provide a great variety of gating circuits. In addition, gating circuits may be re-arranged to provide different forms corresponding to various factored forms of defining equations.

Therefore, it will be readily appreciated that the present invention is not specifically limited to the embodiments discussed, but is generic to a general class of five multiple generators as defined in the following claims.

What is claimed as new is:

1. An electronic five's multiple generator comprising a shift register capable of providing output signals representative of a binary-decimal coded number registered therein, means for serially delivering binary-decimal coded signals representative of a number to be multiplied to said shift register, an output storage device capable of providing an output signal representative of the storage state thereof, a plurality of "logical" gating circuits interconnecting said shift register and said output device to control the storage state of the latter whereby the output signals thereof represent the five's multiple of the number delivered to said shift register, and means for cyclically providing individual timing signals and serially delivering same to said gating circuits in a predetermined time relationship with the delivery of the signals to said shift register, each of said gating circuits being responsive to the individual timing signals in combination with predetermined signals from said shift register or said output storage device.

2. An electronic multiple generator comprising a shift register including a plurality of bistable storage devices, each of said devices being capable of providing complementary output signals representative of the storage condition thereof and thereby the binary-decimal number registered therein, means for serially delivering electrical signals representative of a number to be multiplied to said shift register; an output bistable storage device capable of providing complementary output signals representative of the storage state thereof, a plurality of "logical" gating circuits interconnecting said shift register and said output device to control the storage state of the latter whereby the output signals thereof represent a multiple of the number delivered to said shift register, and means for cyclically providing individual timing signals and serially delivering the signals to said gating circuits in a predetermined time relationship with the delivery of the signals to said shift register, each of said gating circuits being responsive to the individual timing signals in combination with predetermined signals from said shift register or said output storage device.

3. An electronic multiple generator as defined in claim 2 wherein each of said bistable storage devices provide static complementary output signals and said gating circuits include a plurality of logical "and" circuits and at least a single logical "or" circuit.

4. An electronic five's multiple generator comprising at least four serially connected bistable storage devices, each of said devices being characterized as providing output signals representative of the storage condition thereof, means for serially delivering binary-decimal coded electrical signals representative of a number to be multiplied, the least significant digit first, to said devices; an output bistable storage device providing output signals representative of the storage state theeof, at least four "logical" gating circuits interconnecting said four serially connected devices and said output device to control the storage state of the latter whereby the binary-decimal output signals thereof represent the five's multiple of the number delivered to said shift register, and means for cyclically providing a plurality of timing signals and serially delivering the signals to said gating circuits in a predetermined time relationship with the delivery of the signals to said shift register, each of said gating circuits being responsive to a different one of said timing signals in combination with predetermined signals from said serially connected devices and said output storage device.

5. An electronic five's multiple generator as defined in claim 4 including an additional bistable storage device connected with said gating circuits to control the storage state of said output device.

6. An electronic five's multiple generator comprising a shift register capable of providing output signals representative of a binary-decimal coded number registered therein, means for serially delivering a binary-decimal coded signal representative of a number to be multiplied to said shift register, an output storage device capable of providing an output signal representative of the storage state thereof, a plurality of "logical" gating circuits coupled to said shift register for controlling the storage state of said output device whereby the output signals thereof represent the five's multiple of the number delivered to said shift register, complementary signal generating means interconnecting said gating circuits with said output device, and means for cyclically providing individual timing signals and serially delivering the timing signals to said gating circuits in a predetermined time relationship with the delivery of the signals to said shift register, each of said gating circuits being responsive to the individual timing signals in combination with predetermined signals from said shift register or said output storage device.

7. An electronic five's multiple generator comprising a shift register including a plurality of bistable storage devices, each of said devices being characterized as providing complementary static output signals representative of the binary decimal coded number registered in the shift register, means for serially delivering binary decimal coded signals representative of a number to be multiplied, the least significant digit first, to said shift register; an output bistable storage device capable of providing complementary static output signals representative of the storage state thereof, a plurality of logical gating circuits connected to receive the output signals from said shift register and from said output device for "logically" combining said signals and producing an output signal in response thereto, at least a single logical "or" circuit connected to each of said gating circuits and to said outputput device for controlling the storage state of the latter whereby the output signals thereof represent the five's multiple of the signals delivered to said shift register, and means for cyclically providing individual timing signals serially delivered to said gating circuits in a predetermined time relationship with the delivery of the signals to said shift register, each of said gating circuits being responsive to a different one of said timing signals in combination with predetermined signals from said shift register or said output storage device.

(References on following page)

References Cited in the file of this patent

UNITED STATES PATENTS

| | | |
|---|---|---|
| 2,594,731 | Connolly | Apr. 29, 1952 |
| 2,634,052 | Bloch | Apr. 7, 1953 |
| 2,644,887 | Wolfe | July 7, 1953 |
| 2,685,407 | Robinson | Aug. 3, 1954 |
| 2,711,526 | Gloess | June 21, 1955 |

FOREIGN PATENTS

| | | |
|---|---|---|
| 1,035,453 | France | Apr. 15, 1953 |

OTHER REFERENCES

"Synthesis of Electronic Computing and Control Circuits," Harvard University, 1951, pages 218–220.

"Algebraic Theory For Use In Digital Computer Design," Nelson, IRE Transactions, Electronic Computers, September 1954, pages 12–21.

UNITED STATES PATENT OFFICE

Certificate of Correction

Patent No. 2,850,233 September 2, 1958

John Virgil Blankenbaker

It is hereby certified that error appears in the printed specification of the above numbered patent requiring correction and that the said Letters Patent should read as corrected below.

Throughout the description, wherever it appears,

"${W_k}^{j}$" should be —$W_k^j$—;
"${W_k}^{1}$" should be —$W_k^1$—;
"${W_k}^{2}$" should be —$W_k^2$—;
"${W_k}^{3}$" should be —$W_k^3$—;
"${W_k}^{4}$" should be —$W_k^4$—;
"${W_{k-1}}^{1}$" should be —$W_{k-1}^1$—;
"${W_{k-1}}^{2}$" should be —$W_{k-1}^2$—;
"${W_{k-1}}^{3}$" should be —$W_{k-1}^3$—;
"${W_{k-1}}^{4}$" should be —$W_{k-1}^4$—;
"${\overline{W}_k}^{1}$" should be —$\overline{W}_k^1$—;
"${\overline{W}_{k-1}}^{2}$" should be —$\overline{W}_{k-1}^2$—;
"${Z_k}^{j}$" should be —$Z_k^j$—;
"${Z_k}^{1}$" should be —$Z_k^1$—;
"${Z_k}^{2}$" should be —$Z_k^2$—;
"${Z_k}^{3}$" should be —$Z_k^3$—;
"${Z_k}^{4}$" should be —$Z_k^4$—;
"${\overline{Z}_k}^{1}$" should be —$\overline{Z}_k^1$—;
"${Z_{k-1}}^{3}$" should be —$Z_{k-1}^3$—;
"${Z_{k-1}}^{4}$" should be —$Z_{k-1}^4$—;
"${C_k}^{1}$" should be —$C_k^1$—;
"${C_k}^{2}$" should be —$C_k^2$—;
"${C_k}^{3}$" should be —$C_k^3$—;
"${C_k}^{j}$" should be —$C_k^j$—;
"${\overline{C}_k}^{2}$" should be —$\overline{C}_k^2$—;

Column 7, line 6, "$F^6$", second occurrence, should be —$\overline{F}^6$—; Column 11, line 8, the equation "$toFj=\overline{F}j.G+Fj.\overline{\overline{H}}$" should be —$toFj=\overline{F}^j.G+F^j.\overline{\overline{H}}$—; Column 14, line 17, the equation "$toF5=Z_k^j=T^1.(\overline{F}^1.F^4+F^1.\overline{F}^4+T^2.(\overline{F}^2.F^4+F^2.\overline{F}^4.\overline{F}^5+$" should be —$toF5=Z_k^j=T^1.(\overline{F}^1.F^4+F^1.\overline{F}^4)+T^2.(\overline{F}^2.F^4+F^2.\overline{F}^4.\overline{F}^5+$—.

Signed and sealed this 2nd day of December 1958.

[SEAL]

Attest:
KARL H. AXLINE,
*Attesting Officer.*

ROBERT C. WATSON,
*Commissioner of Patents.*